(12) United States Patent
Jorgensen et al.

(10) Patent No.: US 8,211,331 B2
(45) Date of Patent: Jul. 3, 2012

(54) PACKAGED REACTIVE MATERIALS AND METHOD FOR MAKING THE SAME

(75) Inventors: Scott W. Jorgensen, Bloomfield Township, MI (US); Martin P. Sulic, Center Line, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/792,720

(22) Filed: Jun. 2, 2010

(65) Prior Publication Data

US 2011/0297879 A1 Dec. 8, 2011

(51) Int. Cl.
*C01B 6/24* (2006.01)
*C01B 6/06* (2006.01)
*C01B 3/02* (2006.01)
*C01B 3/04* (2006.01)
*B05D 7/24* (2006.01)
*B05D 7/02* (2006.01)
*B05D 7/14* (2006.01)

(52) U.S. Cl. ......... 252/188.27; 252/188.25; 252/188.26; 252/181.3; 252/181.4; 252/181.6; 252/181.7; 427/212; 427/214; 427/215; 427/216; 427/220; 427/221; 427/222; 427/409; 427/410; 427/415; 148/400; 148/415; 148/420; 148/437

(58) Field of Classification Search ............... 252/181.3, 252/181.4, 181.6, 181.7, 188.25, 188.26, 252/188.27; 148/400, 415, 420, 437; 427/212, 427/214, 215, 216, 220, 221, 222, 384, 385.5, 427/386, 388.1, 409, 410, 415
See application file for complete search history.

(56) References Cited

U.S. PATENT DOCUMENTS

| 2,261,292 | A |   | 11/1941 | Salnikov |
|---|---|---|---|---|
| 2,513,997 | A | * | 7/1950 | Gibb, Jr. .................. 252/188.26 |
| 2,963,405 | A | * | 12/1960 | Seemuller .................... 424/70.4 |
| 3,377,955 | A | * | 4/1968 | Hodgson ........................ 102/289 |
| 3,919,405 | A | * | 11/1975 | Lenz et al. .................... 423/646 |
| 3,995,559 | A | * | 12/1976 | Bice et al. ..................... 102/284 |
| 4,157,732 | A |   | 6/1979 | Fonner |
| 4,623,597 | A | * | 11/1986 | Sapru et al. ................... 429/101 |
| 5,532,074 | A | * | 7/1996 | Golben ........................... 429/53 |
| 6,881,234 | B2 | * | 4/2005 | Towsley ....................... 29/623.5 |
| 7,322,412 | B2 |   | 1/2008 | Badalamenti et al. |
| 2007/0181224 | A1 | * | 8/2007 | Marya et al. .................. 148/400 |
| 2007/0248879 | A1 | * | 10/2007 | Durkot et al. ................ 429/130 |
| 2009/0011297 | A1 | * | 1/2009 | Jang et al. ....................... 429/19 |
| 2009/0029105 | A1 | * | 1/2009 | Masukawa et al. ........... 428/116 |
| 2009/0113795 | A1 | * | 5/2009 | Eickhoff .......................... 48/116 |
| 2010/0063244 | A1 |   | 3/2010 | Poe et al. |

FOREIGN PATENT DOCUMENTS

| DE | 10 2009 036 945 A1 | * | 3/2011 |
| JP | 07041301 A | * | 10/1995 |
| JP | 2004027346 A | * | 1/2001 |
| WO | WO 2008/079485 |   | 7/2008 |

* cited by examiner

*Primary Examiner* — Joseph D Anthony

(74) *Attorney, Agent, or Firm* — Dierker & Associates, P.C.

(57) ABSTRACT

A packaged reactive material includes a reactive material that is configured to increase in size when exposed to a predetermined gas, and an inert coating material surrounding a surface of the reactive material. The inert coating material is configured to allow the predetermined gas to diffuse through to the reactive material and has an elongation that will not accommodate expansion of the reactive material at full saturation of the predetermined gas.

18 Claims, 3 Drawing Sheets

PACKAGED REACTIVE MATERIALS AND METHOD FOR MAKING THE SAME

TECHNICAL FIELD

The present disclosure relates generally to packaged reactive materials and a method for making the same.

BACKGROUND

Preparing reactive materials for shipping may require involved assembling and handling procedures. For example, some reactive materials are manufactured under a continuous blanket of a high purity inert gas. This type of operation is not readily flexible and may increase the cost of shipping and manufacturing.

SUMMARY

A packaged reactive material includes a reactive material that is configured to increase in size when exposed to a predetermined gas, and an inert coating material surrounding a surface of the reactive material. The inert coating material is configured to allow the predetermined gas to diffuse through to the reactive material and has an elongation that will not accommodate expansion of the reactive material at full saturation of the predetermined gas. A method for packaging a reactive material is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the packaged reactive materials disclosed herein include reactive materials that are coated with a material that protects, for a desired time frame, the reactive materials from air, moisture, and/or other external environmental factors that may lead to reactive material degradation or other undesirable deleterious affects. The coating material is selected so that it fractures when the reactive material expands as a result of hydrogenation when used in its typical operating environment. As such, the packaged reactive materials disclosed herein are protected from various environmental conditions prior to normal operation (i.e., during shipping, pre-use handling, etc.), and are easily allowed to function in the desirable manner at a desirable time without any additional steps or treatments required beyond the regular, intended use of the reactive material.

Generally, the non-limiting examples of the packaged reactive material include at least two components, the reactive material and an inert coating material established on a surface of the reactive material. The reactive material increases in size when exposed to a predetermined gas. The inert coating material surrounds the reactive material, and allows the predetermined gas to diffuse through to the reactive material. The inert coating material has an elongation that will not accommodate expansion of the reactive material at full saturation or absorption of the predetermined gas in the reactive material. As such, the inert coating material will eventually split open to release the interior reactive material.

Figure 1:
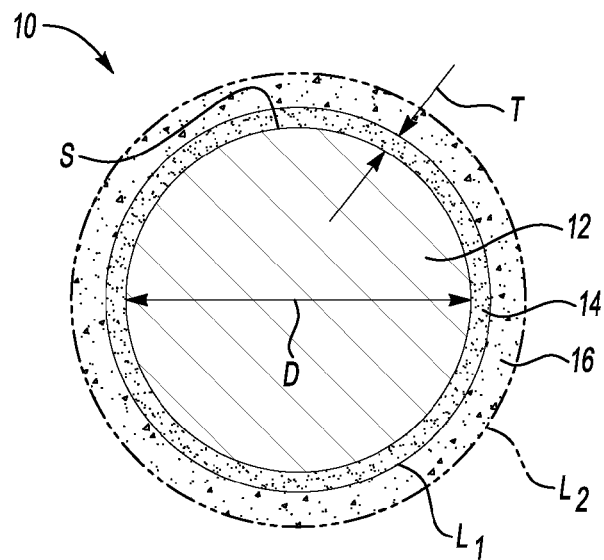
FIG. 1 is a schematic cross-sectional view of an example of a packaged reactive material.
Figure 2A:
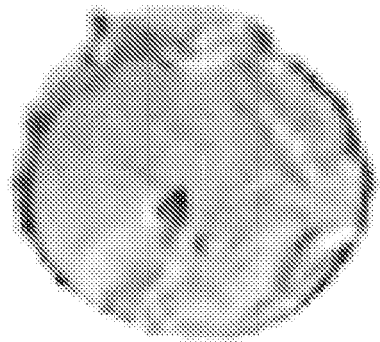
FIGS. 2A and 2B are black and white representations of photographs of an example of a polystyrene coated sodium alanate pellet before (FIG. 2A) and after (FIG. 2B) being exposed to constant air flow for seven days.
Figure 2B:
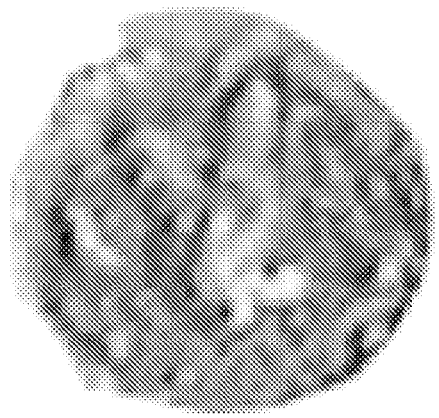
Figure 3A:
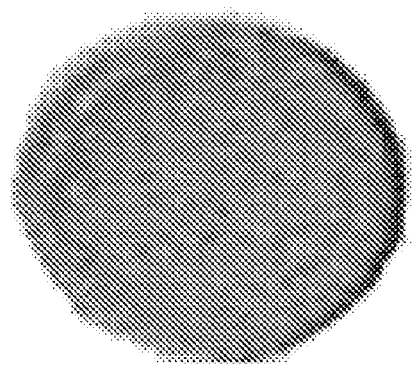
FIGS. 3A and 3B are black and white representations of photographs of a comparative example of an uncoated sodium alanate pellet before (FIG. 3A) and after (FIG. 3B) being exposed to constant air flow for seven days.
Figure 3B:
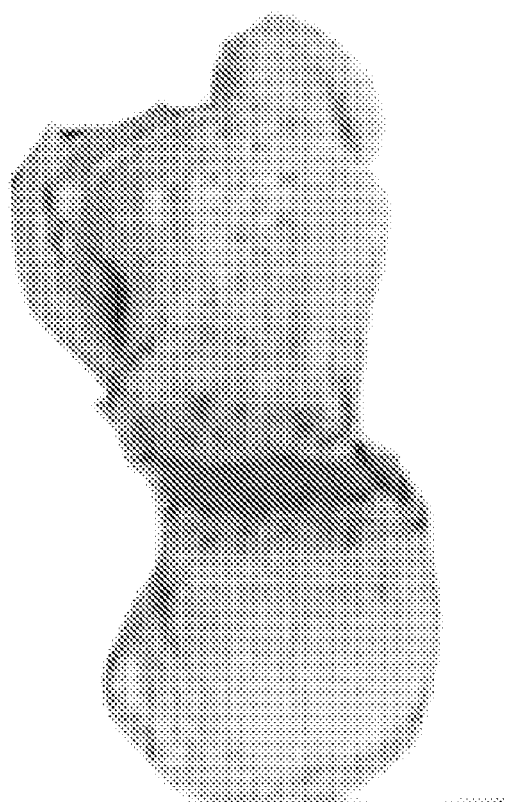

Referring now to FIG. 1, a schematic cross-sectional view of an example of the packaged reactive material 10 is depicted. The packaged reactive material 10 includes the reactive material 12 at the core, and an inert coating material 14 (and in some examples 16) covering the surface S of the reactive material 12. It is to be understood that the description of the example of the packaged reactive material 10 in FIG. 1 utilizes hydrogen as the predetermined gas, and a hydrogen storage material as the reactive material 12. It is to be further understood that this example is non-limiting, and that other predetermined gases, reactive materials 12, and inert coating materials 14, 16 are within the purview of this disclosure.

The reactive material 12 may be selected from any gas storage material that swells or increases in size when saturated with such gas. The selected material 12 inherently absorbs the gas, and thus naturally expands upon being saturated therewith. In the non-limiting example shown in FIG. 1, the reactive material 12 is a hydrogen storage material that swells or increases in size when hydrogenated. This example of the reactive material 12 inherently absorbs hydrogen, and thus naturally expands upon being hydrogenated. Depending upon the material 12 used, the size increase may range anywhere from about 2% of the original size and up to 400% of the original size.

The form of the reactive material 12 may be a pellet that is round, oval, or some other regular geometric shape, or a pellet that has some non-regular shape (e.g., an agglomeration of particles). In one example, the largest diameter D of the reactive material 12 pellet (i.e., prior to hydrogenation) ranges from about 1 mm to about 10 cm. It is to be understood that the reactive material 12 may also be formed in any other desirable shape and/or size, depending upon the desired application for the reactive material 12.

In one example, the reactive material 12 includes solid-phase hydrogen storage materials, examples of which include, but are not limited to $NaAlH_4$, $KAlH_4$, or $LiAlH_4$. These materials may either be in their pure form, or include additional aluminum. These materials may also be catalyzed, for example, by adding from about 1 mole percent to about 4 mole percent $TiCl_3$. In another example, the reactive material 12 includes, but is not limited to divalent cation alanates (e.g., $Mg(AlH_4)_2$), divalent cation alanates mixed with monovalent alanates (e.g., $Na(AlH_4)$), borohydrides (e.g., $LiBH_4$, $NaBH_4$, $Mg(BH_4)_2$, $Ca(BH_4)_2$, or the like), borohydride mixtures, or borohydrides mixed with alanates. It is to be understood that $NaBH_4$ may be a desirable reactive material to protect when long term exposure is required or desired, even though the reaction of $NaBH_4$ with water is slow when compared to some of the other reactive materials 12 listed herein. In still another example, the reactive material 12 is a metal hydride, including, but not limited to, $MgH_2$ or the like, or transition metals that hydrogenate (e.g., $Ti_yFe_x$, where x and y are the various proportions for stoichiometric or off-stoichiometric amounts, TiCrMn, and the generic intermetallic hydrogen absorbing families, such as AB, $AB_2$, $AB_5$ (e.g., $LaNi_5$ which hydrogenates to $LaNi_5H_6$), BCC, etc.). Still another example of the reactive material 12 includes alane ($AlH_3$), which is desirable in a single use (i.e., not cycled repeatedly in place) application and may be used in a mixture with another storage material that will expand on exposure to free hydrogen. The reactive material 12 may, in some instances, be selected from other nitrogen bearing compounds (e.g., $LiNH_2$, $Mg(NH_2)_2$, $Li_3B_2NH_{10}$, and mixtures of these compounds with other hydrides) or other hydrogen bearing compounds (e.g., $MgH_2$, $CaH_2$, etc.). It is to be understood that the reactive material 12 may also include mixtures of two or more of the previously listed components.

The reactive material 12 is also reactive to one or more external environments, such as air, solvent(s), water vapor (i.e., moisture), or the like, or combinations thereof. When exposed to one or more of these external environments, the reactive material 12 may degrade, become inactive, or undergo some other deleterious affect.

To reduce the exposure of the reactive material 12 to one or more of these external environments, the packaged reactive material 12 disclosed herein includes at least one layer $L_1$ of an inert coating material 14 deposited thereon. Generally, the inert coating material 14 selected is a polymer that is i) impermeable to the component (e.g., air, water, solvent, etc.) of the external environment that undesirably reacts with the reactive material 12, and ii) permeable to the predetermined gas. In the example described in reference to FIG. 1, the inert coating material 14 selected is a polymer that is i) impermeable to the component (e.g., air, water, solvent, etc.) of the external environment that undesirably reacts with the reactive material, and ii) permeable to hydrogen. As such, the inert coating material allows hydrogen (or another predetermined gas) to diffuse through to the reactive material 12, and does not allow air, water vapor, solvent(s), other external environments, and/or combinations thereof to diffuse through to the reactive material 12. It is to be understood that the inert coating material 12 also has an elongation that will not accommodate expansion of the reactive material 12 at full hydrogenation (or saturation of another predetermined gas). In other words, the inert coating material 14 is selected to have a fracture characteristic and brittleness that causes the coating material 14 to split open or self-remove when the reactive material 12 increases in size. As such, the type of reactive material 12 used will dictate, at least in part, the selection of the inert coating material 14. For example, the reactive material 12 will have an anticipated expansion upon hydrogenation (or saturation), and the inert coating material 14 may be selected so that its elongation is less than this anticipated expansion. These non-stretch characteristics of the inert coating material 14 allow it to break, fracture and/or crack, rather than expand with the expanding reactive material 12. This disruption in the continuity of the inert coating material 14 exposes the reactive material 12 directly to hydrogen (or the other predetermined gas), allowing this material 12 to function in its intended manner. In general, the slowest or limiting step in hydrogenation or dehydrogenation (or saturation/desaturation) is the entry or exit of the solid phase at the nanoscopic level, thus a few openings will give hydrogen (or other predetermined gas) free access to enter or exit the pellet.

For at least a hydrogen storage reactive material 12, the inert coating material(s) 14, 16 may be selected from, but is/are not limited to, polyvinylidene difluoride (PVDF), celluloses such as ethylcellulose and methyl cellulose polymers, polystyrene of either mixed molecular weight or of a predetermined molecular weight, acrylic polymers such as polymethylmethacrylate, polyvinyl chlorides, acetals such as polyoxomethylene, polyamides, polyimides, epoxys, and polytetrafluoroethylene (PTFE). Copolymers and/or block copolymers that possess the desirable properties of permeability and elongation may also be used. When polystyrene is used, the molecular weight of the selected polystyrene allows for expansion of the coating material(s) 14, 16 that is less than the expansion due to the hydrogenation of the reactive material 12. As such, the nominal molecular weight of the polystyrene selected also depends, at least in part, upon the reactive material 12 used. Commercially available polystyrene may be used, which may have a mixture of molecular weights therein.

As illustrated in FIG. 1, in one example, multiple layers $L_1$, $L_2$ of inert coating materials 14, 16 may be used. The inert coating material 14 is established as the continuous layer $L_1$ on the surface S of the reactive material 12, and the inert coating material 16 is established as the continuous layer $L_2$ on the surface (not labeled) of the layer $L_1$. By "continuous", it is meant that there are no gaps or holes in the layer(s) $L_1$, $L_2$. It is to be understood that each of the layers $L_1$, $L_2$ of the inert coating materials 14, 16 may have any suitable thickness T that depends, at least in part, upon the reactive material 12 and the desired rate of hydrogenation and material 12 exposure. In one example, the thickness T of each of the layers $L_1$, $L_2$ ranges from about 1 μm to about 1 mm.

The second layer $L_2$ is shown in phantom to illustrate that a single layer $L_1$ of the inert coating material 14 may be used in some instances. When additional inert coating material layers $L_2$ are utilized, it is to be understood that any desirable number of layers $L_1$, $L_2$ (i.e., two or more) may be used. In one example, multiple layers $L_1$, $L_2$ of the same inert coating material 14 are used. In another example, multiple layers $L_1$, $L_2$ of different inert coating materials 14, 16 are used. For example, it may be desirable to deposit a slick polymer layer over a chemically resistant polymer layer in order to achieve both the desirable stability and the desirable handling properties of the packaged reactive material 10. One non-limiting example of materials that may be used for the multi-layered embodiment includes sodium alanate and mixed polystyrene.

In view of the above description, it is to be understood that one can tune the inert coating material layer(s) $L_1$, $L_2$ to a predetermined degree of sensitivity. The sensitivity of the layer(s) $L_1$, $L_2$ will depend upon how long the reactive material 12 is to be protected in the air, water vapor, solvent(s), etc., how fast hydrogen (or another predetermined gas) should diffuse through the layer(s) $L_1$, $L_2$ upon exposure to hydrogen (or the other predetermined gas), and the degree to which the coating(s) 14, 16 should break up. Generally, thicker coating layers $L_1$, $L_2$ provide more protection from the external environment, but hydrogenation (or saturation) will likely take longer and may tend to favor ripping of the coating material(s) 14, 16 in one spot as opposed to many spots.

In one example, the inert coating material(s) 14, 16 is/are doped with one or more additives. Such additives are selected from heat transfer enhancing additives, friction reducing additives, wear resistant additives, or combinations thereof. Heat transfer enhancing additives help with the functions of heat management and protection. Non-limiting examples of the heat transfer enhancing additives include expanded natural graphite (ENG); conductive polymers (e.g., polyacetylene or polythiophenes); conductive nanostructures (i.e., structures having at least one dimension ranging from 1 nm to 100 nm), such as carbon, metal or other conductive nanofibers or nanowires, nanotubes, nanoparticles, or the like; conductive powders; or combinations thereof. One non-limiting example of the friction reducing additive includes polytetrafluoroethylene (commercially available under the tradename TEFLON® from DuPont). One non-limiting example of the wear resistant additive includes ceramic particles. In instances where multiple layers $L_1$, $L_2$ are used, the additive may be present in one of the layers $L_1$, $L_2$ (e.g., the second of the two layers) in an amount ranging from 1% by volume up to 50% by volume. In instances where the additive functions in the same manner as the protective inert coating material 14, 16 (e.g., ceramic dust, which is impermeable and does not stretch at all), then any desirable amount of the additive may be added to the inert coating material 14, 16 provided that the resulting layer(s) $L_1$, $L_2$ maintains mechanical integrity and allows for diffusion of hydrogen to the reactive material 12.

An example of the method for making any example of the packaged reactive material 10 will now be described. More particularly, the following discussion relates to the example including the reactive material 12 with the first inert coating material layer 14, L1 established thereon. At the outset, the method includes selecting the reactive material 12 and the inert coating material 14 according to the guidelines set forth herein (i.e., the inert coating material 14 allows some predetermined gas to diffuse therethrough and has an elongation that will not accommodate expansion of the reactive material at full saturation or absorption).

The selected inert coating material 14 is dissolved in a non-reactive organic or inorganic solvent to form an inert coating material solution. Any ratio of inert coating material 14, 16 to solvent that is physically possible could be used, and this ratio will depend, at least in part, on the viscosity of the resulting mixture and the desired drying time. In one non-limiting example, the material/solvent mixture would be 10% to 50% saturated. However, solutions ranging from dilute solutions for applying very thin coats (this could be especially useful in applying a second layer that is present, e.g., for friction properties) to saturated solutions (which would be useful for fast drying) are within the purview of this disclosure.

It is to be understood that the solvent selected for the inert coating material 14 (that will make up the layer $L_1$ directly deposited on the surface S of the reactive material 12) should be non-reactive with the reactive material 12, and thus the solvent used depend upon both the inert coating material 14 and the reactive material 12. The solubility of the polymer in the solution will depend on the solvent used. Some non-limiting examples of the non-reactive organic solvent include hydrocarbon solvents, such as hexane, ethers, or ketones. Some non-limiting examples of the non-reactive inorganic solvent include ammonia, supercritical carbon dioxide, supercritical sulfur dioxide, or other similar fluids. The components may be stirred and/or mildly heated until the inert coating material 14 is dissolved.

Once the inert coating material solution is made and rendered to a temperature suitable for contact with the reactive material 12, the solution is coated onto the surface S of the reactive material 12. Coating may be accomplished via any of the wide variety of suitable deposition techniques for painting or coating. For example, the reactive material 12 may be run through a bath of the inert coating material solution on a conveyer belt, or the reactive material 12 may be dipped into the inert coating material solution, or the inert coating material solution may be sprayed onto the surface S of the reactive material 12. The time it takes to coat the surface S may depend upon the technique used, but the minimal time is that which is long enough to wet the reactive material 12 with the solution. For example, the time frame to achieve the single layer $L_1$ when using a dipping technique is literally how quick the reactive material 12 can be dipped into the solution.

Once the reactive material 12 is wet with the inert coating material solution, the non-reactive solvent is allowed to evaporate to form the inert coating material layer $L_1$ on the surface S of the reactive material 12. Drying may be accomplished with or without an external influence (e.g., fan, hot air, etc.) When evaporation is allowed to occur in the absence of an external influence, drying time is dictated by how quickly the selected solvent evaporates on its own. Additionally, drying time may also depend, at least in part, on the viscosity of the inert coating material solution. For example, low viscosity solutions can form quite thin film layers and the thinner the solution, the faster the layer $L_1$ will dry. When the solvent evaporates, the packaged reactive material 10 is formed.

In the example of the method for making the packaged reactive material 10 including multiple layers $L_1$, $L_2$, the first inert coating material layer $L_1$ is established as previously described. When additional layers $L_2$, etc. are desirable, the previously outlined steps may be repeated as many times as is needed to achieve the desired number of layers $L_1$, $L_2$. Such steps may be repeated with the same inert coating material 14, or with different inert coating materials 16, or with alternating inert coating materials 14, 16, 14, 16, or with the same inert coating material 14 and an additive. It is to be understood that any other desired pattern of coating materials 14, 16 and/or any desirable number of layers $L_1$, $L_2$, may be used.

Since the reactive material 12 is already coated with the first layer $L_1$ (i.e., is protected from air, water, solvent(s), etc.), a wider variety of solvents is available when forming the additional layer(s) $L_2$, etc. It is to be understood that when forming the additional layers $L_2$, etc., the solvent may be selected from any solvent that does not penetrate or dissolve the first layer $L_1$ during application. As such, in one example, the solvent is water.

In one non-limiting example, when forming the second layer $L_2$, the method set forth hereinabove further includes selecting the second inert coating material 16 that is different from the inert coating material 14. This second inert coating material 16 is dissolved in a solvent that is non-reactive with the first layer $L_1$ to form a second inert coating material solution. The second inert coating material solution is coated onto the inert coating material layer $L_1$ using one of the previously described coating techniques. The non-reactive solvent used in the second inert coating material solution is then allowed to evaporate to form the second inert coating material layer $L_2$ on the inert coating material layer $L_1$ already formed on the surface S of the reactive material 12.

It is to be understood that the method(s) disclosed herein may be performed in the absence of water (i.e., in an inert atmosphere) and/or in the absence of heat at a temperature above the desaturation (e.g., dehydrogenation) temperature of the reactive material 12. For example, when a mixture of hydrogenated and dehydrogenated materials make up the reactive material 12, the process takes place below the dehydrogenation temperature of the hydrogenated materials. The desaturation or dehydrogenation temperature will vary from reactive material 12 to reactive material 12, but in one example, this temperature ranges from about 65° C. to about 400° C. In still other instance, a dry atmosphere (i.e., less than 1% relative humidity) may be suitable for performing the method(s) disclosed herein. Again, performing the method in this manner will depend upon the reactive material 12 and its sensitivity to the environment in which the method is performed. As such, a particular environment may be desirable or needed for applying the first layer $L_1$, but this particular environment may no longer be desirable or needed once the reactive material 12 is coated with that first layer $L_1$.

During routine use of the packaged reactive material 10 (i.e., a normal use for the uncoated reactive material 12), the packaged reactive material 10 will be exposed to the predetermined gas. The predetermined gas will diffuse through the inert coating material layer(s) $L_1$, $L_2$ and the reactive material 12 will become saturated and the volume of the material 12 will expand. Since the inert coating material layer(s) $L_1$, $L_2$ are designed not to be sufficiently expandable, the expanding reactive material 12 will cause the inert coating material layer(s) $L_1$, $L_2$ to self-remove by breaking, cracking, fracturing, shattering, or the like. As a result, the inert coating material layer(s) $L_1$, $L_2$ are destroyed, thereby allowing the reactive material 12 to function as intended. In some instances, multiple gas exposure (e.g., hydrogenation) cycles may be performed in order to achieve even greater (and in some instances full) access to the underlying reactive material 12. Routine uses of a hydrogen storage packaged reactive material 10 may include in a hydrogen storage tank for a vehicle, a stationary storage facility, a portable power unit, etc. A pellet may be used for powering micro fuel cells in small devices (e.g., hand held units that require electric power, small remote devices, worn electrical devices, or the like). In still another application, the material coating 14, 16 may be ruptured using a saturation desaturation step (e.g., a hydrogenation dehydrogenation step), and then the reactive material 12 may be exposed to an intended gas to cause the desired reaction. In other instances, hydrogen or methane gas may be directly consumed in a fuel cell, burner, engine, or other energy or power conversion device, while $CO_2$ and $SO_2$ may be scrubbed from a stream of gas or stored for later reaction.

While the previous description of FIG. 1 relates to reactive materials 12 that expand upon hydrogenation and suitable inert coating materials 14, 16 therefore, it is to be understood that other reactive material 12 and other inert coating material(s), 14, 16 may be selected, respectively, to be sensitive to and permeable to other gases, such as methane. In such instances, the reactive material 12 expands when exposed to the other gas, which permeates through the selected coating material. As such, the coating material is selected to protect the reactive material 12 from air, water, solvent(s), etc., to be non-reactive with the reactive material 12, and to enable diffusion of the desired other gas. In these other examples, the saturation of the reactive material with the other gas causes the non-expandable inert coating material(s) 14, 16 to split to expose the reactive material 12.

Other (i.e., non-hydrogen storage) reactive materials 12 include those that expand upon absorption of methane and/or carbon dioxide ($CO_2$), and/or sulfur dioxide ($SO_2$). Non-limiting examples of these reactive materials 12 include any of the family of self assembling materials known by the various acronyms, MOFs (metal organic frameworks), COFs (covalent organic frameworks), PIMs (polymers of intrinsic micro-porosity), MILs (Matérial Institut Lavoisier), etc., mine gas absorbents, clays with high surface area (i.e., 100 $m^2/g$), graphitic and other carbon structures including carbon nanostructures of all sorts which expand upon gas absorption. Suitable inert coating materials 14, 16 include those previously mentioned.

To further illustrate embodiment(s) of the present disclosure, the following examples are given herein. It is to be understood that these examples are provided for illustrative purposes and are not to be construed as limiting the scope of the disclosed embodiment(s).

EXAMPLE 1

One batch of sodium alanate pellets was coated with mixed molecular weight polystyrene. The pellets were dipped, by hand, in the polymer three times. Another comparative batch of sodium alanate pellets was left uncoated. The example and comparative batches were left in fume hood for 7 days with constant air flow. As illustrated in FIGS. 2A, 2B, 3A and 3B, minimal oxidation occurred with the coated pellet (see FIGS. 2A and 2B) as compared to uncoated pellet (see FIGS. 3A and 3B).

EXAMPLE 2

Figure 4A:
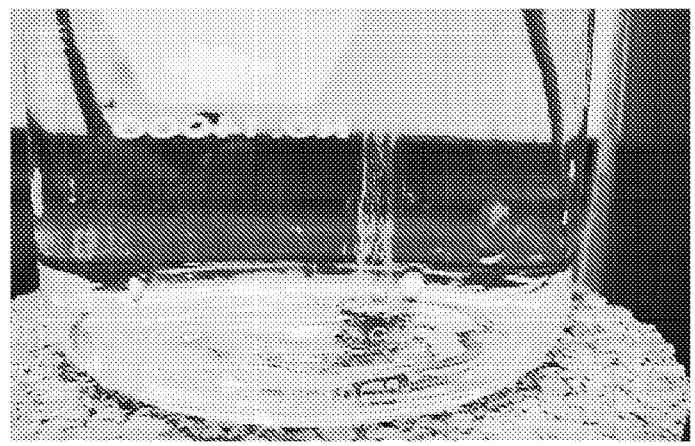
FIGS. 4A, 4B and 4C are black and white representations of photographs of i) a polymer coated pellet after being exposed to zero hydrogen cycles and twenty minutes after water immersion (FIG. 4A), ii) a polymer coated pellet after being exposed to five hydrogen cycles and immediately after water immersion (FIG. 4B), and iii) a polymer coated pellet after being exposed to five hydrogen cycles and twenty seconds after water immersion (FIG. 4C).
Figure 4B:
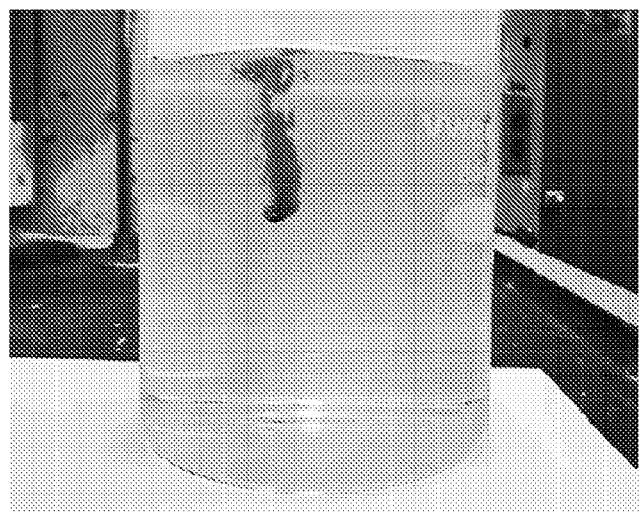
Figure 4C:
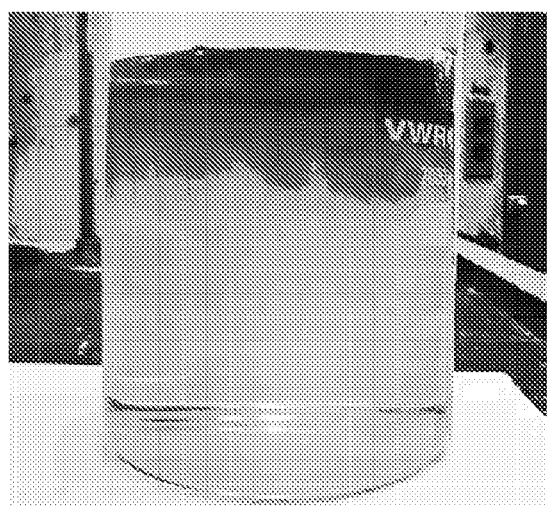

Sodium alanate pellets were coated with three layers of mixed molecular weight polystyrene. The pellets were dipped, by hand, in the polymer three times. Some of the pellets were exposed to zero hydrogen cycles, while the remainder of the pellets was exposed to five hydrogen cycles. As illustrated in FIGS. 4A, 4B, and 4C, the coated pellets are only reactive after being exposed to hydrogenation. FIG. 4A shows that after 20 minutes of submersion in water, the coated material that was not exposed to hydrogen cycles was still intact. The reactive material in this example was clearly protected against uncontrolled reaction due to incidental water exposure or due to moisture in the air. However, once exposed to hydrogen, similarly coated pellets were highly reactive. This is shown in FIG. 4B where the reaction with water is rapid and produces sufficient gas to pull the pellet to the surface of the water. Access to the pellet after hydrogen exposure is sufficient for the pellet to be fully reacted in 20 seconds, as seen in FIG. 4C. This example illustrates that the protective coating protects the reactive material (see FIG. 4A) until the reactive material becomes hydrogenated and expands to allow the inert coating material layer to self-remove at a desirable time (see FIGS. 4B and 4C), thereby rendering the reactive material easily accessible in its intended working environment.

It is to be understood that the ranges provided herein include the stated range and any value or sub-range within the stated range. For example, a weight percent (wt %) range of approximately 1 wt % to about 20 wt % should be interpreted to include not only the explicitly recited weight percent limits of 1 wt % to 20 wt %, but also to include individual weight percentages, such as 2 wt %, 3 wt %, 4 wt %, etc., fractional weight percentages, such as 2.13 wt %, and sub-ranges, such as 5 wt % to 15 wt %, 10 wt % to 20 wt %, etc.

Furthermore, when approximately, about, etc. is used to describe a numerical value, it is to be understood that this generally includes minor variations (e.g., ±0.2) from the stated value.

While several examples have been described in detail, it will be apparent to those skilled in the art that the disclosed examples may be modified. Therefore, the foregoing description is to be considered exemplary rather than limiting.

The invention claimed is:

1. A hydrogen storage packaged reactive material, comprising: a $NaAlH_4$ reactive material that is configured to increase in size when hydrogenated; and at least one inert coating material surrounding a surface of the $NaAlH_4$ reactive material until the $NaAlH_4$ reactive material increases in size, the inert coating material configured to allow hydrogen to diffuse through to the NaAlH$_4$ reactive material and having an elongation that will not accommodate expansion of the NaAlH$_4$ reactive material at full hydrogenation, the at least one inert coating being chosen from celluloses, acetals, polyamides, and polyimides.

2. A packaged reactive material, comprising:
a reactive material that is configured to increase in size when exposed to a predetermined gas;
an inert coating material surrounding a surface of the reactive material until the reactive material increases in size, the inert coating material configured to allow the predetermined gas to diffuse through to the reactive material and having an elongation that will not accommodate expansion of the reactive material at full saturation of the predetermined gas; and
a heat transfer doped into the inert coating material, the heat transfer enhancer being selected from expanded natural graphite, conductive polymers, conductive nanostructures, and combinations thereof.

3. The packaged reactive material as defined in claim 2 wherein the reactive material is reactive to at least one of air, solvents, or water vapor and wherein the inert coating material is impermeable to the at least one of air, solvents, or water vapor.

4. The packaged reactive material as defined in claim 2 wherein the predetermined gas is hydrogen gas, and wherein the reactive material is a hydrogen storage material selected from NaAlH$_4$, KAlH$_4$, LiAlH$_4$, divalent cation alanates, divalent cation alanates mixed with monovalent alanates, borohydrides, borohydrides mixed with alanates, metal hydrides, alane, Mg(NH$_2$)$_2$, Li$_3$B$_2$NH$_{10}$, MgH$_2$, CaH$_2$, and combinations thereof.

5. The packaged reactive material as defined in claim 2 wherein the inert coating material is selected from poly vinyldiene difluoride (PVDF), celluloses, polystyrene of a mixed molecular weight, polystyrene of a predetermined molecular weight, acrylic polymers, acetals, polyamides, polyimides, epoxys, and polytetrafluoroethylene.

6. The packaged reactive material as defined in claim 2, further comprising at least one additional inert coating material deposited on the inert coating material, wherein the at least one additional inert coating material being formed of a polymer other than a polymer used in the inert coating material.

7. The packaged reactive material as defined in claim 2 wherein the inert coating material has a thickness ranging from about 1 μm to about 1 mm.

8. The packaged reactive material as defined in claim 2 wherein the reactive material is a solid mass having an initial diameter ranging from about 1 mm to about 10 cm.

9. The packaged reactive material as defined in claim 2 wherein the predetermined gas is selected from hydrogen gas, carbon dioxide, sulfur dioxide, and methane gas.

10. The packaged reactive material as defined in claim 2 wherein the reactive material is selected from metal organic frameworks, covalent organic frameworks, polymers of intrinsic micro-porosity, Matérial Institut Lavoisier, mine gas absorbents, clays, graphitic structures, and other carbon structures, and wherein the inert coating material is selected from poly vinyldiene difluoride (PVDF), celluloses, polystyrene of a mixed molecular weight, polystyrene of a predetermined molecular weight, acrylic polymers, acetals, polyamides, polyimides, epoxys, and polytetrafluoroethylene.

11. A method for packaging a reactive material, comprising:
selecting an inert coating material that is configured to allow a predetermined gas to diffuse therethrough and has an elongation that will not accommodate expansion of the reactive material at full saturation of the predetermined gas;
dissolving the selected inert coating material in a non-reactive organic or inorganic solvent to form an inert coating material solution;
doping the inert coating material solution with a heat transfer enhancer selected from expanded natural graphite, conductive polymers, conductive nanostructures, and combinations thereof;
coating a surface of a reactive material with the inert coating material solution; and
allowing the non-reactive solvent to evaporate, thereby forming an inert coating material layer on the surface of the reactive material, the inert coating material layer to surround the surface of the reactive material until the reactive material increases in size.

12. The method as defined in claim 11, further comprising selecting a thickness of the inert coating material to tune the inert coating material layer to a predetermined degree of sensitivity.

13. The method as defined in claim 11 wherein the coating of the surface of the reactive material with the inert coating material is accomplished by running the reactive material into a bath of the inert coating material solution on a conveyer, by dipping the reactive material into the inert coating material solution, or by spraying the inert coating material solution onto the surface of the reactive material.

14. The method as defined in claim 11 wherein the coating of the surface of the reactive material with the inert coating material is accomplished in the absence of water or the absence of heat at a temperature above the desaturation temperature of the reactive material.

15. The method as defined in claim 11, further comprising:
selecting a second inert coating material that is different from the inert coating material;
dissolving the selected second inert coating material in a non-reactive solvent to form a second inert coating material solution, the non-reactive solvent being selected from a solvent that does not penetrate or dissolve the inert coating material layer;
coating the inert coating material layer with the second inert coating material solution; and
allowing the non-reactive solvent to evaporate, thereby forming a second inert coating material layer on the inert coating material layer already formed on the surface of the reactive material.

16. The method as defined in claim 15 wherein the coating of the inert coating material layer with the second inert coating material solution is accomplished by running the coated reactive material into a bath of the second inert coating material solution on a conveyer, by dipping the coated reactive material into the inert coating material solution, or by spraying the second inert coating material solution onto a surface of the inert coating material layer.

17. The method as defined in claim 11 wherein selecting the inert coating material includes selecting a material from poly vinylidene difluoride (PVDF), methyl cellulose, polystyrene, and polytetrafluoroethylene.

18. The method as defined in claim 11 wherein the predetermined gas is selected from hydrogen gas, carbon dioxide, sulfur dioxide, and methane gas.

* * * * *